US012619027B2

(12) United States Patent
Hong et al.

(10) Patent No.: US 12,619,027 B2
(45) Date of Patent: May 5, 2026

(54) METHOD AND APPARATUS OF HYBRID INTEGRATED PHOTONICS DEVICES

(71) Applicants: Jin Hong, Saratoga, CA (US); Junqiao Wu, Kensington, CA (US); Danqing Wang, Berkeley, CA (US)

(72) Inventors: Jin Hong, Saratoga, CA (US); Junqiao Wu, Kensington, CA (US); Danqing Wang, Berkeley, CA (US)

( * ) Notice: Subject to any disclaimer, the term of this patent is extended or adjusted under 35 U.S.C. 154(b) by 345 days.

(21) Appl. No.: 18/111,532

(22) Filed: Feb. 18, 2023

(65) Prior Publication Data

US 2024/0184039 A1     Jun. 6, 2024

Related U.S. Application Data

(60) Provisional application No. 63/429,350, filed on Dec. 1, 2022.

(51) Int. Cl.
*G02B 6/12* (2006.01)
*G02F 1/225* (2006.01)

(52) U.S. Cl.
CPC ..... *G02B 6/12004* (2013.01); *G02B 6/12021* (2013.01); *G02F 1/2257* (2013.01); *G02B 2006/12061* (2013.01); *G02B 2006/12097* (2013.01); *G02B 2006/12142* (2013.01)

(58) Field of Classification Search
CPC ........... G02B 2006/12142; G02F 1/025; G02F 1/225; G02F 1/2257
See application file for complete search history.

(56) References Cited

U.S. PATENT DOCUMENTS

| | | | |
|---|---|---|---|
| 10,908,440 B1 * | 2/2021 | Wood | G02F 1/0102 |
| 2011/0315988 A1 * | 12/2011 | Yu | H10F 77/1437 |
| | | | 257/458 |
| 2019/0187370 A1 * | 6/2019 | Nakashiba | G02B 6/122 |
| 2020/0057350 A1 * | 2/2020 | Amin | G02F 1/025 |
| 2021/0003776 A1 * | 1/2021 | Bian | G02B 6/126 |

FOREIGN PATENT DOCUMENTS

| | | | |
|---|---|---|---|
| JP | 2005107804 A | * | 4/2005 |
| JP | 2006029781 A | * | 2/2006 |

* cited by examiner

*Primary Examiner* — Charlie Y Peng

(57) ABSTRACT

Embodiments described herein may be related to optical devices and apparatuses directed to forming waveguides and optical phase modulators that enable high baud rate modulation. In one embodiment, an optical phase modulator includes: photonic optical waveguides having their cladding regions and electrical contacts formed by material with its absolute permittivity near zero (ENZ), and their waveguide core region formed by electro-optical (EO) material or silicon PN junction whose optical refractive index changes with strength of externally applied electrical field. The ENZ material described herein further possesses properties of both optical transparency at operating wavelength and electrical conductivity. The ENZ claddings and electrodes may further have dimensions to enable high externally applied electrical field within waveguide core. The EO material described herein includes but not limited to organic polymers, LiNbO₃, liquid crystals. Other embodiments are described and claimed.

3 Claims, 13 Drawing Sheets

Ring Outer
ENZ ITO
Cladding
1003

Ring Inner
ENZ ITO
Cladding
1004

Bus
Waveguide
Core
1005

Ring Core
Waveguide
1001

Bus
Waveguide
ENZ ITO
Cladding
1002

Input
Waveguide
1006

Insulating gap
1008

Output
Waveguide
1007

TE Mode
Profile
1201

TM Mode
Profile
1202

EO Core
1301

ENZ Cladding
1302

SiO2 Layer
1303

TE Mode
Profile
1304

METHOD AND APPARATUS OF HYBRID INTEGRATED PHOTONICS DEVICES

CROSS REFERENCE TO RELATED APPLICATION

This application claims priority to U.S. Provisional Application No. 63/429,350, filed on Dec. 1, 2022, in the names of Jin Hong, Junqiao Wu and Danqing Wang, entitled "Method and Apparatus of Hybrid Integrated Photonic Devices and Systems," The disclosure of which is hereby incorporated by reference in its entirety.

TECHNICAL FIELD

Embodiments of the present disclosure generally relate to the field of semiconductor devices and apparatus, in particular to photonic waveguides and high speed modulators.

BACKGROUND

Continued growth in computing and mobile devices will continue to increase the demand for high density, large capacity and high speed optical connectivity beyond terabits per second and miniaturized sensing. Current photonic waveguide devices and apparatuses place limits on integration size, density and modulation speed in photonic integrated circuits (PIC).

DETAILED DESCRIPTION

Figure 1:
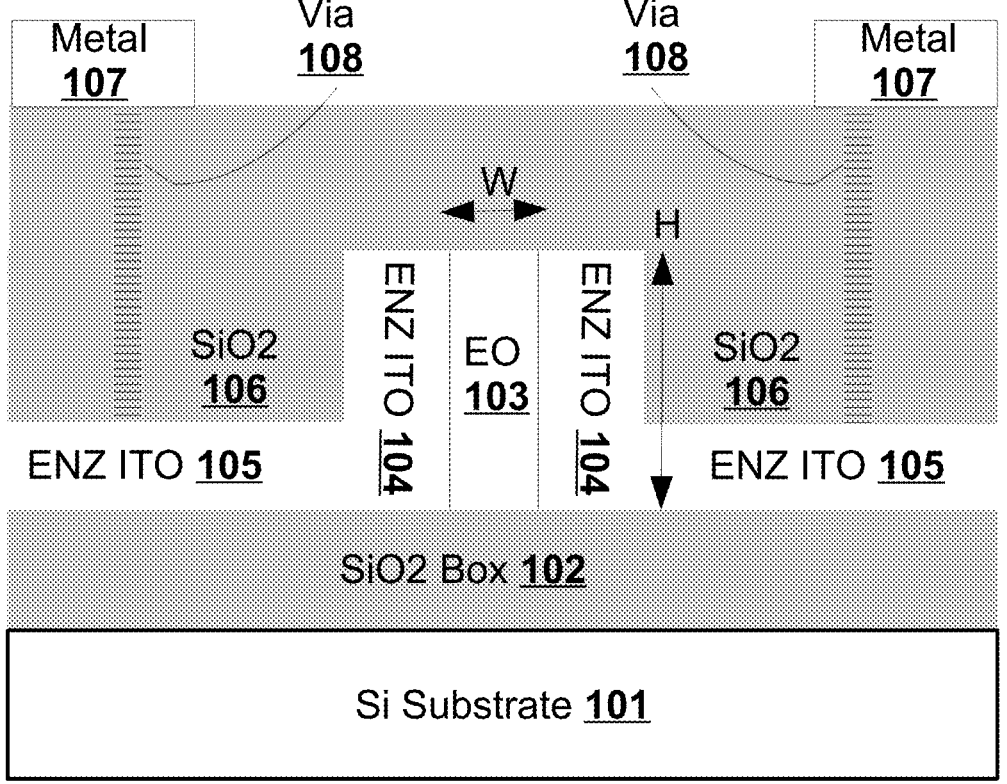
FIG. 1 illustrates the cross section of a photonic waveguide with ENZ material as cladding layers and electrodes, and EO material as its waveguide core on top of a $SiO_2$ layer, in accordance with various embodiments.

Embodiments described herein may be related to designs, devices, apparatuses to enable high speed modulation and high density integration for photonics integrated circuits (PIC) based on silicon photonics platform for beyond 100 GBaud applications. Embodiments described herein may include optical waveguides capable of sharp turns and insensitivity to waveguide wall roughness, photonic waveguides with vacuum core capable of sensing optical index changes, fast tunable waveguide phase shifter enabling beam steering, Mach-Zehnder Modulator (MZM), Micro Ring Modulator (MRM), Multi-Mode Interferometer (MMI), using an ENZ material as both their optical transparent cladding layer and/or their electrical conducting pathway and electrode contacts, and an EO material and/or silicon rib waveguide, or silicon PN junction as their core region of the waveguides. Some of these embodiments facilitate high speeds for a MZM and MRM due to increased optical confinement factor, the enhanced electrical conductivity to contacts close to the core, the reduced device capacitance, the increased electrical field strength across the core region of the waveguides, the extended device length capable of the accumulation of optical phase change, and the reduced sensitivity to manufacturing induced waveguide sidewall roughness that causes losses.

Legacy implementations use dielectric material as the cladding of the waveguides which has an optical refractive index much larger than ENZ materials used in the present disclosure and therefore result in low optical confinement for the operating mode. Legacy implementations also use heavily doped semiconductors such as silicon to feedthrough the driving voltages of the MZM modulator arms to the active core region that results in less strength of the externally applied electrical field across the core and hence less effective change in the optical refractive index of the mode. Other legacy implementations use long devices for accumulated phase shifting effect that results in complexity of the solutions or limit to very short device distance due to a large extra loss encountered. These legacy implementations pose various limits on the speed and/or modulation efficiency of the modulators.

Data transmission capacity requirements continue to increase in data centers. These capacity can be increased by higher baud rate per optical channel or by more parallel optical channels at a lower baud rate. However, technique by increasing baud rate has a benefit on the size, power consumption, cost, integration density and the like may be superior to the technique that uses additional parallel optical channels.

A challenge for ultra-high-speed MZM design is to achieve high modulation efficiency and bandwidth. Legacy implementations using PN junction in silicon photonics have difficulty to achieve beyond 100 Gb/s per channel PAM4 applications while still require a long device length in the range of several millimeters which may raise stringent design requirements for integration applications.

In legacy implementations of MZM design, modulating signal voltages are usually applied to metal based electrodes, which are highly absorptive to optical waves. Therefore the electrodes have to be placed far away from the optical waveguide core region, as most of the optical waveguides are relatively weakly confined optically and their optical mode profiles tend to extend outside of the waveguide core region significantly and may experience significant loss caused by metal materials near the waveguides.

In other legacy implementations of MZM design, the electrical field strength derived from metal based electrodes are quite weak inside the waveguide core region and thus could not induce sufficiently large optical refractive index change and the accumulated phase shift by the applied electrical field without a long device length.

In other legacy implementations of MZM design, the metal electrodes are placed closely to generate high electrical field strength, but the optical loss becomes very high so the workable device length becomes short, for example within several tens of micrometers, thus limits the total available phase shift after all for MZM operations. In some other implementations, a very thin layer of several nanometers of metal material is sandwiched between dielectric semiconductor materials for inducing extra electron accumulation and associated index change to achieve certain level of on and off modulation but resulting in major optical losses associated with the optical mode.

In legacy implementations of optical waveguides, the optical mode confinement is weak and the optical mode profile tends to extend much outside of the waveguide core area and thus its loss becomes sensitive to small radius waveguide bending, sharp waveguide routing, waveguide sidewall roughness and shape irregularities caused by non-ideal manufacturing processes, and etc.

In the following detailed description, reference is made to the accompanying drawings which form a part of hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure.

For the purpose of the present disclosure, the phrase "A and/or B" means (A), (B), or (A and B).

The description may use perspective-based descriptions such as right/middle/left, top/bottom, in/out, over/under, and the like. Such descriptions are merely used to facilitate the discussion and are not intended to restrict the application of embodiments described herein to any particular orientation.

The description may use the phases "in an embodiment," or "in embodiments," which may each refer to one or more of the same or different embodiments. Furthermore, the terms "comprising," "having," and the like, as used with respect to embodiments of the present disclosure, are synonymous.

Various Figures herein may depict one or more layers of one or more designs. The layers and structures depicted herein are depicted as examples of relative positions of the layers, structures, and materials. The layers and structures are depicted for the purposes of explanation, and are not drawn to scale. Therefore, comparative sizes of layers and structures should not be assumed from the Figures, and sizes, thicknesses, or dimensions may be assumed for some embodiments only where specifically indicated or discussed.

FIG. 1 illustrates the cross section of a photonic waveguide with ENZ ITO material as both transparent cladding layer and conductive electrode contact, and EO material as its waveguide core on top of a silicon base substrate with a $SiO_2$ box layer in between, while the waveguide is further covered by $SiO_2$ on top, in accordance with various embodiments. For legacy photonic waveguides, the cladding layers are normally made of dielectric materials such as $SiO_2$ which has less optical confinement to the optical mode in the core region, and the electrical paths for the external voltages to be applied to the active core region are normally made of either P-doped or N-doped silicon structures, or sometimes with some of the traditional noble metals such as Gold, Silver, Platinum or Copper, or some of the metal composites, and the like, which has either much less electrical conductivity for the external voltage signals in the case of doped silicon or much higher optical losses to the mode in the core in the case of the traditional metals or its composites.

The photonic waveguide of FIG. 1 includes a silicon substrate 101, a $SiO_2$ box layer 102 on top of the silicon substrate 101 as normally used in the silicon photonics foundries, a waveguide core region 103 made of EO material with a width of "W" and a height of "H" as depicted, a vertical side cladding layer 104, and a horizontal cladding layer 105 on top of the box layer 102, all on both the right and left sides of the core region 103. Both cladding layers 104 and 105 are connected physically as one structure on each side of the core region 103, made of epsilon-near-zero (ENZ) material, and in this embodiment with Indium Tin Oxide (ITO) material doped to achieve ENZ condition. The top of the EO core region 103 and the ENZ ITO cladding layers 104 and 105 are covered by a deposited $SiO_2$ protective layer 106, The externally applied modulating voltage signals are connected to the noble electrode pads 107 on the top layer of the waveguide, which are then separately connected to the horizontal ENZ ITO electrodes 105 on left and right side of the core region 103 through a metal via 108 that is normally made of Tungsten for high speed applications on the corresponding side of the core region 103.

Figure 2:
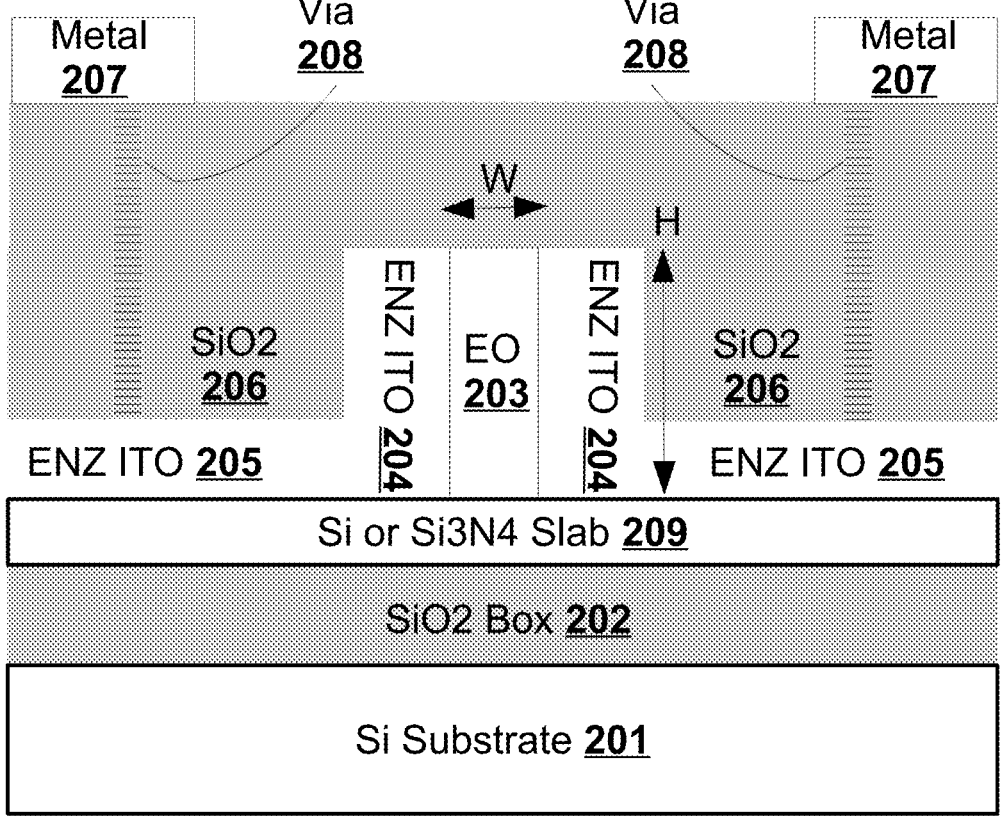
FIG. 2 illustrates the cross section of a photonic waveguide with ENZ material as cladding layers and electrodes, and EO material as its waveguide core on top of a thin silicon layer, in accordance with various embodiments.

The photonic waveguide of FIG. 2 includes a silicon substrate 201, a $SiO_2$ box layer 202 on top of the silicon substrate 201 as normally used in the silicon photonics foundries, a waveguide core region 203 made of EO material with a width of "W" and a height of "H" as depicted, a vertical side cladding layer 204, and a horizontal cladding layer 205 on top of a slab waveguide layer 209 made of either silicon or $Si_3N_4$ material which sits additionally on top of the box layer 202, all on both sides of the core region 203. Both cladding layers 204 and 205 are connected physically as one structure on each side of the core region 203, made of ENZ materials, and in this embodiment with ITO material doped to achieve ENZ condition. The top of the EO core region 203 and the ENZ ITO cladding layers 204 and 205 are covered by a deposited $SiO_2$ protective layer 206, The externally applied modulating voltage signals are connected to the noble electrode pads 207 on the top layer of the waveguide, which are then separately connected to the horizontal ENZ ITO electrodes 205 on the left and right side of the core region 203 through a metal via 208 individually that is normally made of metal Tungsten for high speed applications on the corresponding side of the core region 203. The thickness of the $SiO_2$ box layer is usually 2 μm and the thickness of the slab waveguide 209 is determined by the design of the core waveguide, and in the case of silicon slab waveguide, is normally in the range of 0.2 μm.

Figure 3:
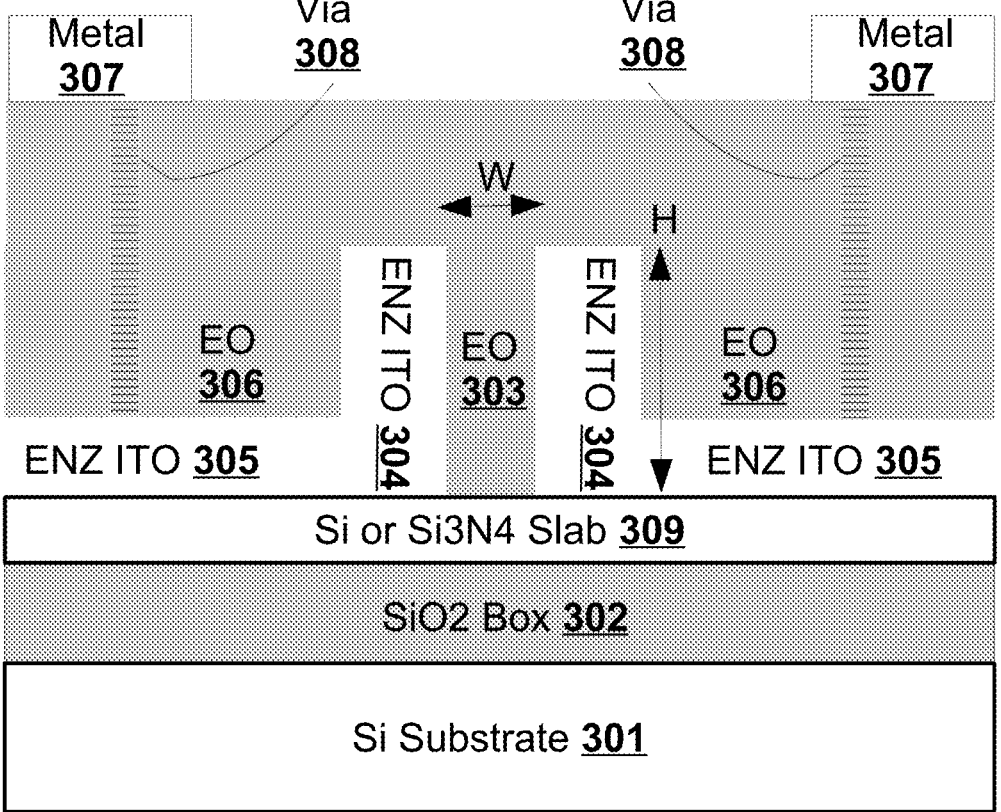
FIG. 3 illustrates the cross section of a photonic waveguide with ENZ material as cladding layers and electrodes, and EO material as its waveguide core and its top insulating layer.

The photonic waveguide of FIG. 3 includes a silicon substrate 301, a $SiO_2$ box layer 302 on top of the silicon substrate 301 as normally used in the silicon photonics foundries, a waveguide core region 303 made of EO material with a width of "W" and a height of "H" as depicted, a vertical side cladding layer 304, and a horizontal cladding layer 305 on top of a slab waveguide layer 309 made of either silicon or $Si_3N_4$ material which sits additionally on top of the box layer 302, all on both sides of the core region 303. Both cladding layers 304 and 305 are connected physically as one structure on each side of the core region 303, made of ENZ materials, and in this embodiment with ITO material doped to achieve ENZ condition. The top of the EO core region 303 and the ENZ ITO cladding layers 304 and 305 are covered by a EO material 306 which is the same as the EO material in the core region 303 and is applied to the outer protective region during the same process such as spin coating, sputtering and etc as to the EO core region, The externally applied modulating voltage signals are connected to the noble electrode pads 307 on the top layer of the waveguide, which are then separately connected to the horizontal ENZ ITO electrodes 305 on the left and right side of the core region 303 through a metal via 308 individually that is normally made of metal Tungsten for high speed applications on the corresponding side of the core region 303.

Figure 4:
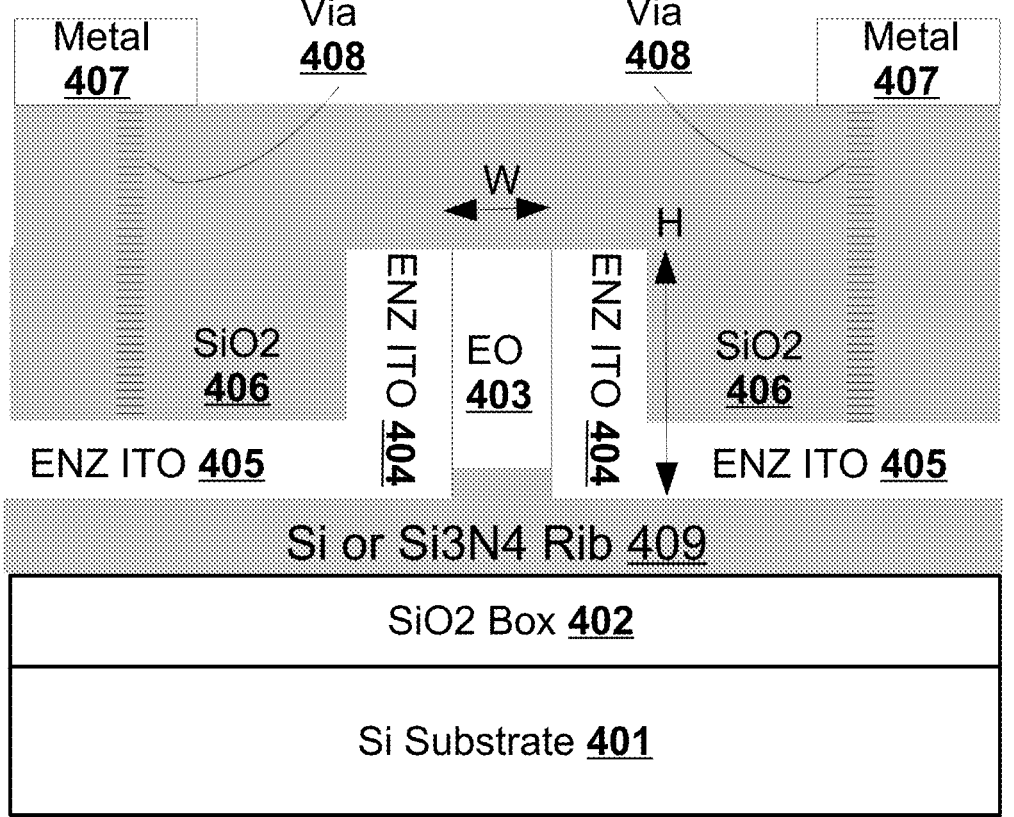
FIG. 4 illustrates the cross section of a photonic waveguide with ENZ material as cladding layers and electrodes, and EO material as portion of waveguide core along with a silicon rib in the core.

The photonic waveguide of FIG. 4 includes a silicon substrate 401, a $SiO_2$ box layer 402 on top of the silicon substrate 401, a waveguide core region 403 made of both a EO material at the top part and a shallow rib portion that is from either silicon or $Si_3N_4$ material with a height of about 0.2 μm at the bottom part of the core region, together with a waveguide core width of "W" and a height of "H" as depicted, a vertical side cladding layer 404 on both the right and left side of the core region, and a horizontal cladding layer 405 on top of a rib waveguide layer 409 made of either silicon or $Si_3N_4$ material which sits additionally on top of the $SiO_2$ box layer 402, all on both sides of the core region 403. Both cladding layers 404 and 405 are connected physically as one structure on each side of the core region 403, made of ENZ material, and in this embodiment with ITO material doped to achieve ENZ condition. The top of the EO core region 403 and the ENZ ITO cladding layers 404 and 405 are covered by a deposited $SiO_2$ protective later 406. The externally applied modulating voltage signals are connected to the noble electrode pads 407 on the top layer of the waveguide, which are then separately connected to the horizontal ENZ ITO electrodes 405 on the left and right side of the core region 403 through a metal via 408 individually that is normally made of metal Tungsten for high speed applications on the corresponding side of the core region 403.

Figure 5:
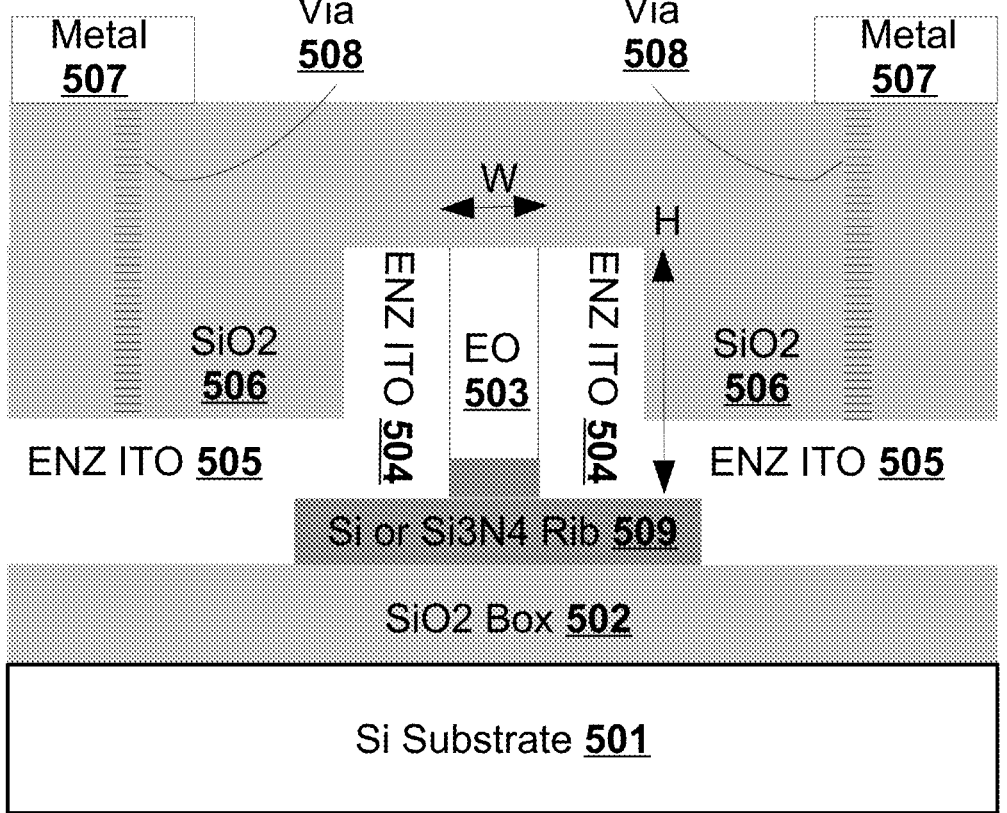
FIG. 5 illustrates the cross section of a photonic waveguide with ENZ material as cladding layers and electrodes wherein portion of the ENZ material extends further onto the box layer, and EO material as portion of waveguide core along with a silicon rib in the core.

The photonic waveguide of FIG. 5 includes a silicon substrate 501, a $SiO_2$ box layer 502 on top of the silicon substrate 501, a waveguide core region 503 made of both a EO material at the top part and a shallow rib portion that is from either silicon or $Si_3N_4$ material with a height of about 0.2 μm at the bottom part of the core region, together with a waveguide core width of "W" and a height of "H" as depicted, a vertical side cladding layer 504 on both the right and left side of the core region, and a horizontal cladding layer 505 in small part on top of a rib waveguide layer 509 made of either silicon or $Si_3N_4$ material which sits additionally on top of the $SiO_2$ box layer 502, and also in large part on top of $SiO_2$ box layer 502, all on both sides of the core region 503. Both cladding layers 504 and 505 are connected physically as one structure on each side of the core region 503, made of ENZ materials, and in this embodiment with ITO material doped to achieve ENZ condition. The top of the EO core region 503 and the ENZ ITO cladding layers 504 and 505 are covered by a deposited $SiO_2$ protective later 506. The externally applied modulating voltage signals are connected to the noble electrode pads 507 on the top layer of the waveguide, which are then separately connected to the horizontal ENZ ITO electrodes 505 on the left and right side of the core region 503 through a metal via 508 individually that is normally made of metal Tungsten for high speed applications on the corresponding side of the core region 503.

Figure 6:
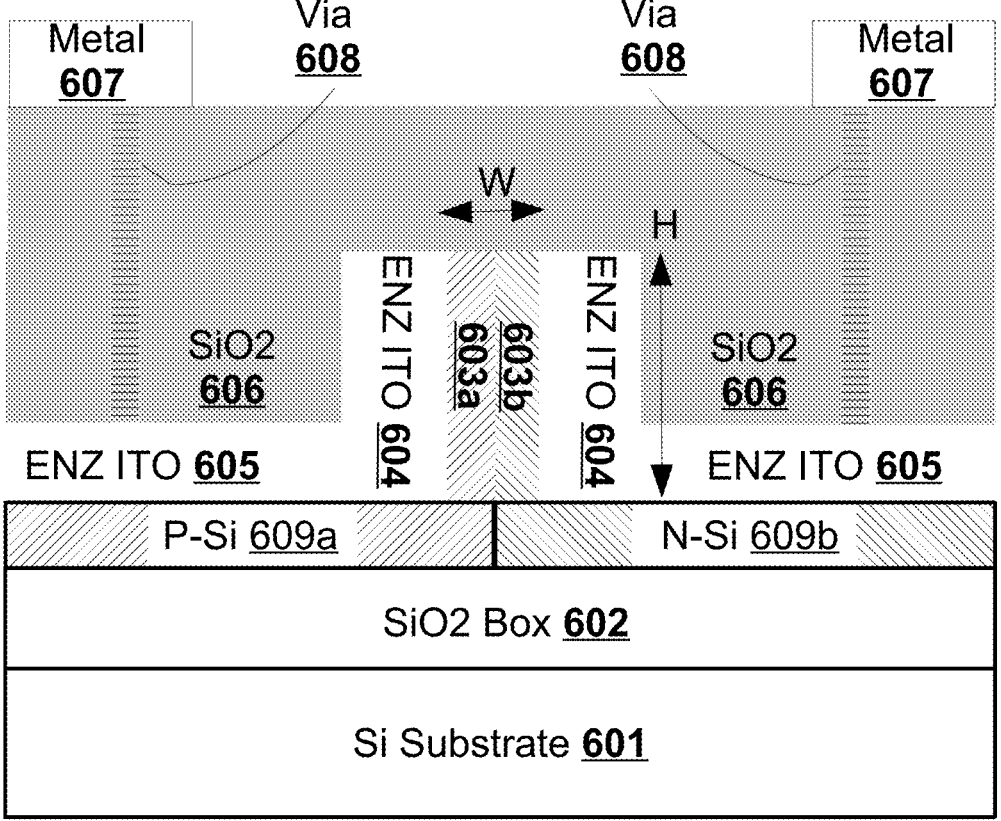
FIG. 6 illustrates the cross section of a photonic waveguide with ENZ material as cladding layers and electrodes, and a PN-junction based silicon rib as its waveguide core.

The photonic waveguide of FIG. 6 includes a silicon substrate 601, a $SiO_2$ box layer 602 on top of the silicon substrate 601, a waveguide core region 603a and 603b made of a PN junction of silicon waveguide with half of its core width on the left side 603a doped with P-type of dopants and another half of its width on the right side 603b doped with N-type of dopants that sits on the top of a shallow slab silicon waveguide 609a and 609b of a height about 0.2 μm doped on the left side with P-dopants 609a and on the right side with N-dopants 609b, together forming a waveguide core region made of a PN-junction with a width of "W" and a height of "H" as depicted, a vertical side cladding layer 604 on both the right and left side of the core region, and a horizontal cladding layer 605 on top of a rib PN junction based waveguide layer 609 that sits on top of the $SiO_2$ box layer 602 all on both sides of the core region. Both cladding layers 604 and 605 are connected physically as one structure on each side of the core region, and in this embodiment made with ITO material doped to achieve ENZ condition. The top of the core region and the ENZ ITO cladding layers 604 and 605 are covered by a deposited $SiO_2$ protective later 606. The externally applied modulating voltage signals are connected to the noble electrode pads 607 on the top layer of the waveguide, which are then separately connected to the horizontal ENZ ITO electrodes 605 on the left and right side of the core region through a metal via 608 individually that is normally made of metal Tungsten for high speed applications on the corresponding side of the core region.

Figure 7:
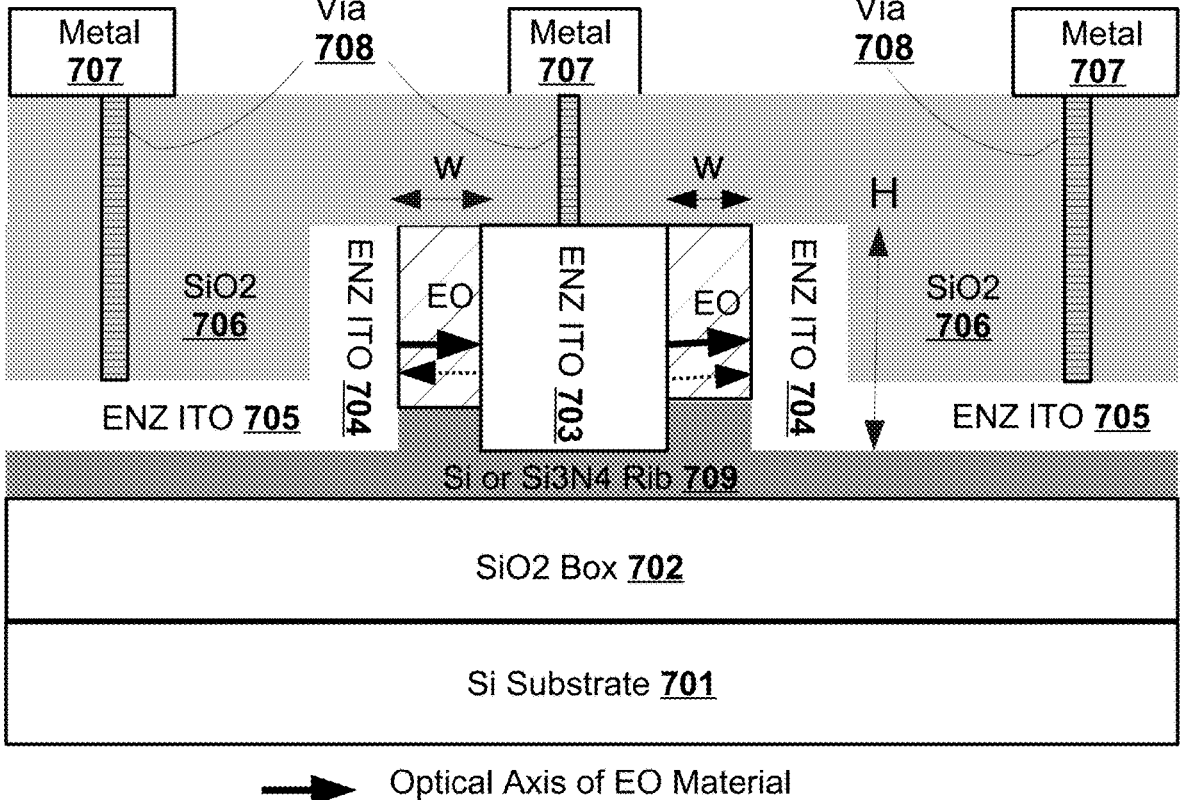
FIG. 7 illustrates the cross section of two parallel photonic waveguides, sharing the center cladding layer and electrode, with ENZ ITO material as cladding layers and electrodes for both waveguides and EO material as portion of its waveguide core along with a silicon rib in the core of each waveguide.

The photonic waveguide of FIG. 7 includes a silicon substrate 701, a $SiO_2$ box layer 702 on top of the silicon substrate 701, two vertically parallel waveguide core regions made of both a EO material at the top part of each core waveguide and a shallow rib portion of each core waveguide that is formed either by silicon or by $Si_3Na_4$ material with a height of about 0.2 μm at the bottom part of the two core regions, together with each waveguide core width of "W" and a height of "H" as depicted and with both core regions separated by a middle ENZ ITO layer 704, a vertical side cladding layer 704 on both the right and left side of the two core regions, and a horizontal cladding layer 705 on top of the rib waveguide layer 709 made of either silicon or $Si_3N_4$ material that sits on top of $SiO_2$ box layer 702, all on both sides of the two core regions. Both cladding layers 704 and 705 are connected physically as one structure on each side of the two core regions and made of ENZ material, and in this embodiment with ITO material doped to achieve ENZ condition. The top of the EO core region and the ENZ ITO cladding layers 704 and 705 are covered by a deposited $SiO_2$ protective later 706. The externally applied modulating voltage signals are connected to the noble electrode pads 707 on the top layer of the waveguides, which are then separately connected to the horizontal ENZ ITO electrodes 705 on the left, right side and the middle of the two core waveguide regions through metal via 708 individually that is normally made of metal Tungsten for high speed applications in the corresponding region. Those two core waveguide regions are the cores of the active phase shifters in the two arms of the MZM in some of the embodiments. The direction of the solid arrow in each of the parallel core waveguides indicates the direction of the dominant optical axis for the EO material, and the direction of the dashed arrow in each of the parallel core waveguides indicates the direction of the externally applied electrical field at half of the modulating cycle which can reverse their directions at the same time at the other half of the modulating cycle pending on the external driving configurations.

Figure 8:
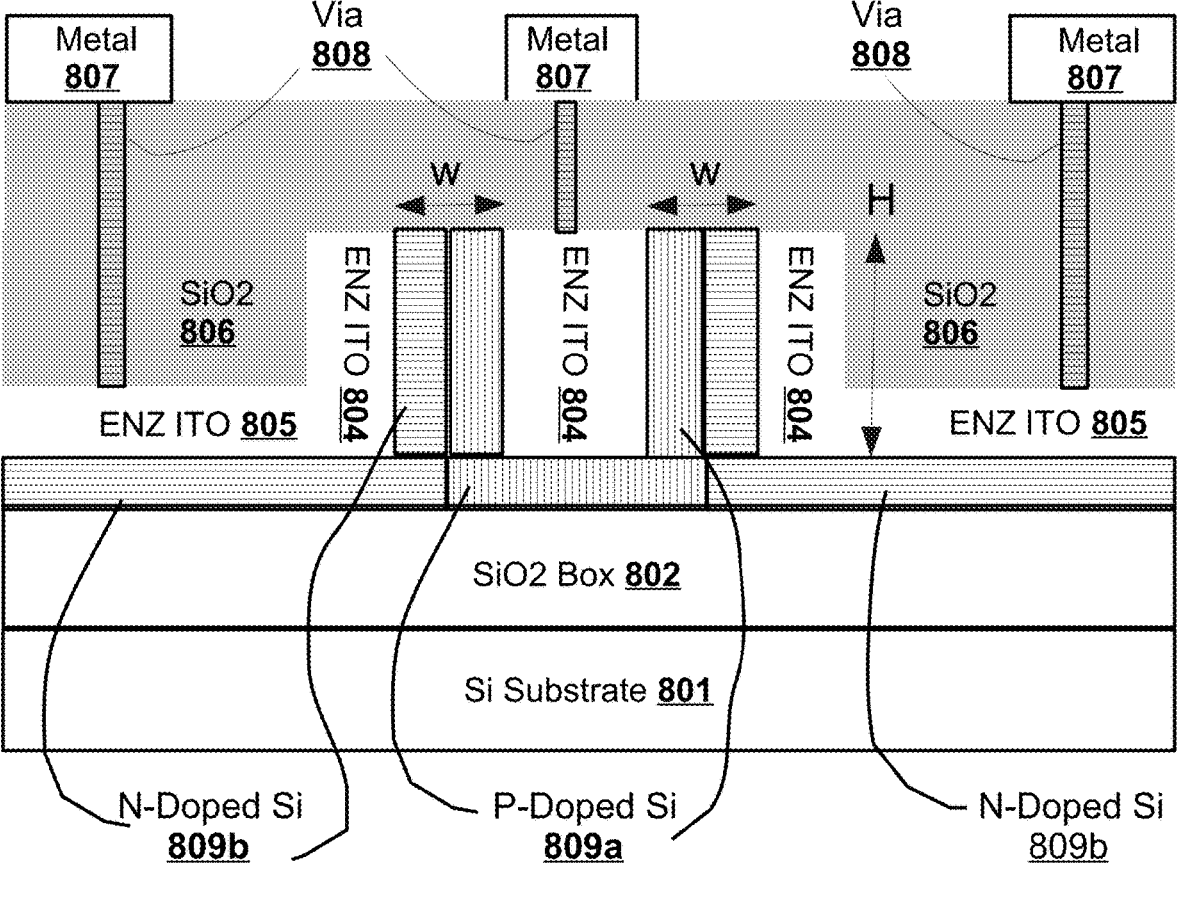
FIG. 8 illustrates the cross section of two parallel photonic waveguides, sharing the center cladding layer and electrode, with ENZ ITO material as cladding layers and electrodes for both waveguides and a PN-junction based silicon rib for each waveguide core.

The photonic waveguide of FIG. 8 includes a silicon substrate 801, a SiO$_2$ box layer 802 on top of the silicon substrate 801, two vertically parallel waveguide core regions made of a PN junction of silicon waveguide with half of its core width on the left side 809$b$ doped with N-type of dopants and another half of its width on the right side 809$a$ doped with P-type of dopants for the first core waveguide on the left side of the shared middle ENZ ITO cladding layer 804 and a PN junction of silicon waveguide with half of its core width on the right side 809$b$ doped with N-type of dopants and another half of its width on the left side 809$a$ doped with P-type of dopants for the second core waveguide on the right side of the shared middle ENZ ITO cladding layer 804 with both core waveguides sit on the top of a shallow slab portion of the silicon waveguide 809$a$ and 809$b$ of a height about 0.2 μm doped on the center portion 809$a$ with P-dopants and on the outer left and right sides 809$b$ with N-dopants, together forming two vertically parallel waveguide core regions made of a PN-junction in each core waveguide with a width of "W" and a height of "H" as depicted, a vertical side cladding layer 804 on both the right and left side of the two core regions, and a horizontal cladding layer 805 on top of a PN junction based waveguide layer 809$a$ and 809$b$ that sit on top of the SiO$_2$ box layer 802 all on both sides of the two core regions. Both cladding layers 804 and 805 are connected physically as one structure on each side of the core region, and in this embodiment made with ITO material doped to achieve ENZ condition. The top of the core region and the ENZ ITO cladding layers 804 and 805 are covered by a deposited SiO$_2$ protective later 806. The externally applied modulating voltage signals are connected to the noble electrode pads 807 on the top layer of the waveguide, which are then separately connected to the horizontal ENZ ITO electrodes 805 on the left and right side and the shared middle cladding of the two core regions through metal via 808 individually that is normally made of metal Tungsten for high speed applications on the corresponding side of the two core regions. Those two core waveguide regions are the cores of the active phase shifters in the two arms of the MZM in some of the embodiments.

Figure 9:
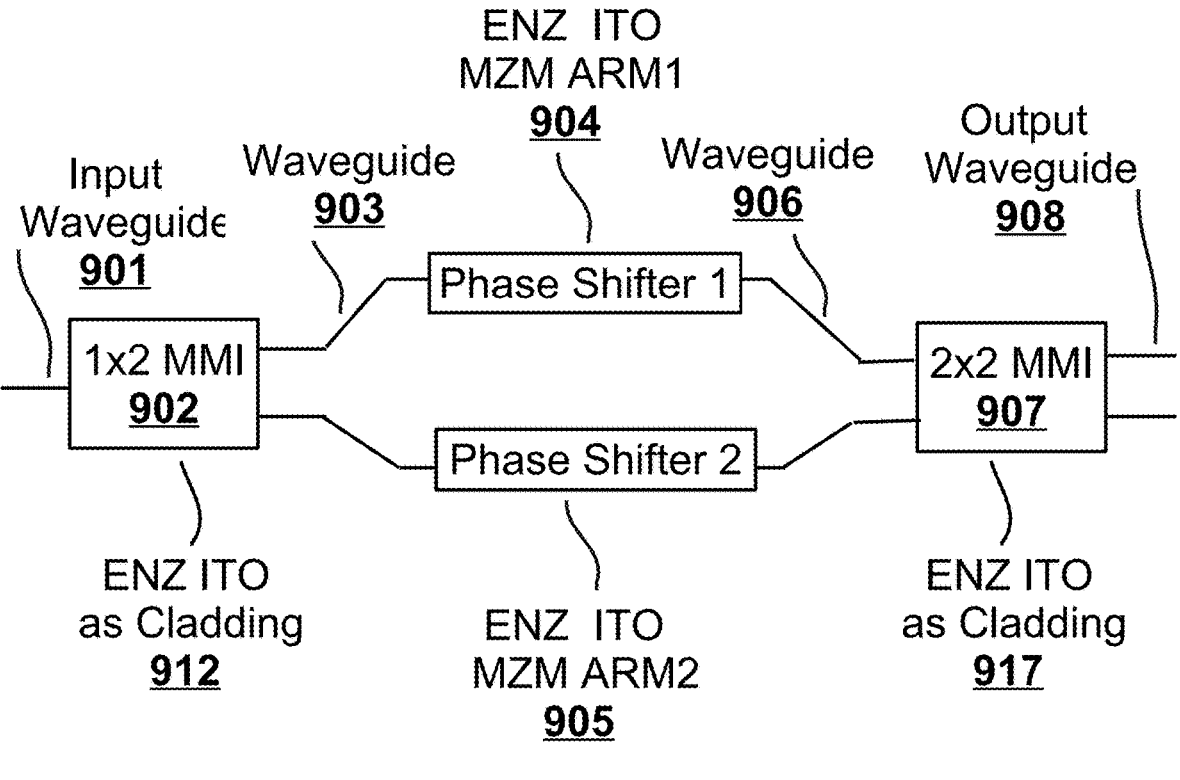
FIG. 9 shows the top view of a block diagram of Mach-Zehnder modulator (MZM), with ENZ material as its waveguide cladding layers and electrodes and EO material or PN junction as its core region.

FIG. 9 illustrates a block diagram of a Mach-Zehnder modulator (MZM) in accordance to various embodiments. In the diagram, an input photonic waveguide 901 connects to a one-by-two (1×2) multi-mode interferometer (MMI) 902 whose waveguide cladding layer 912 is made of ENZ ITO material as one of its embodiments and its core rib waveguide layer is made of either SiO$_2$, Si, Si$_3$N$_4$ in accordance with various embodiments as shown in FIG. 1 to FIG. 8. The two output splitter waveguides 903 of the 1×2 MMI are connected to the two phase shifters of the two arms 904 and 905 of the MZM which are further connected to the two waveguides 906 that connect to the two-by-two (2×2) MMI 907 at the output whose waveguide cladding layer 917 is made of ENZ ITO material as one of its embodiments and its core rib waveguide layer is made of either SiO$_2$, Si, Si$_3$N$_4$ in accordance with various embodiments as shown in FIG. 1 to FIG. 8. One of the output arms of the 2×2 MMI 907 is used as the output waveguide 908 of the MZM. The cross sections of the MZM arms 904 and 905 are illustrated in accordance to the various embodiments of FIG. 1 to FIG. 8.

Figure 10:
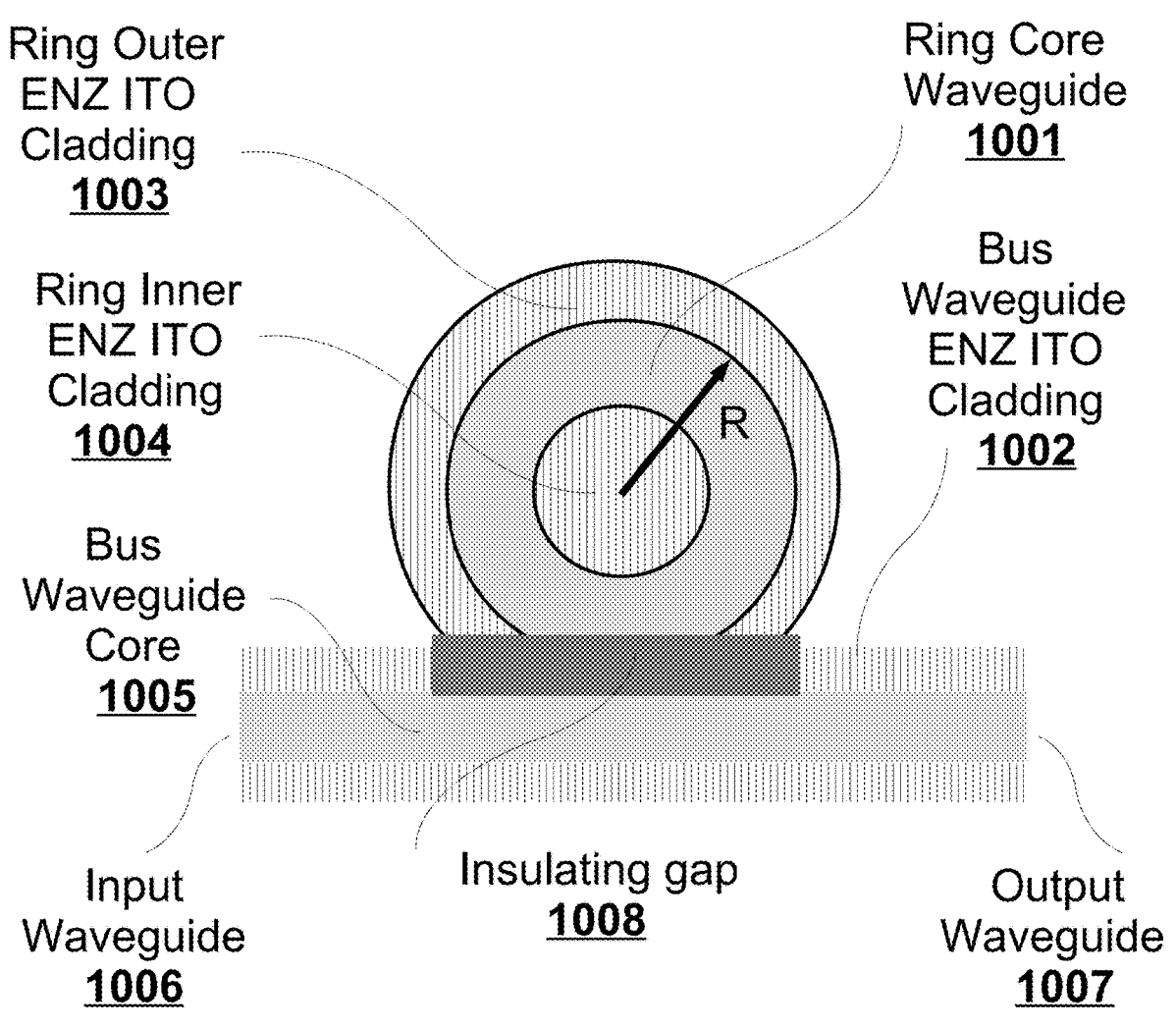
FIG. 10 shows the top view of a micro ring modulator (MRM), with ENZ material as its waveguide cladding layers and electrodes and EO material or PN junction as its core region.

FIG. 10 illustrates a top view of a Micro Ring modulator (MRM) with ENZ ITO as both its inner and outer transparent cladding layers and its conducting electrodes, in accordance to various embodiments. In the top view of the MRM, a bus waveguide comprising input waveguide 1006 and output waveguide 1007 is made of a bus waveguide core region 1005 and bus waveguide cladding region 1002 formed by ENZ ITO material in this embodiment, a ring resonator of outer radius "R", with its ring core waveguide 1001 made of a silicon PN junction as in embodiment of FIG. 6 or EO materials in other embodiments, and its ring inner cladding region 1004 and outer cladding regions 1003 made of ENZ ITO materials in accordance with various embodiments. The insulating gap 1108 between the bus waveguide and the ring resonator is normally small, formed by SiO$_2$ and adjustable based on the various waveguide designs and the detailed embodiments.

Figure 11:
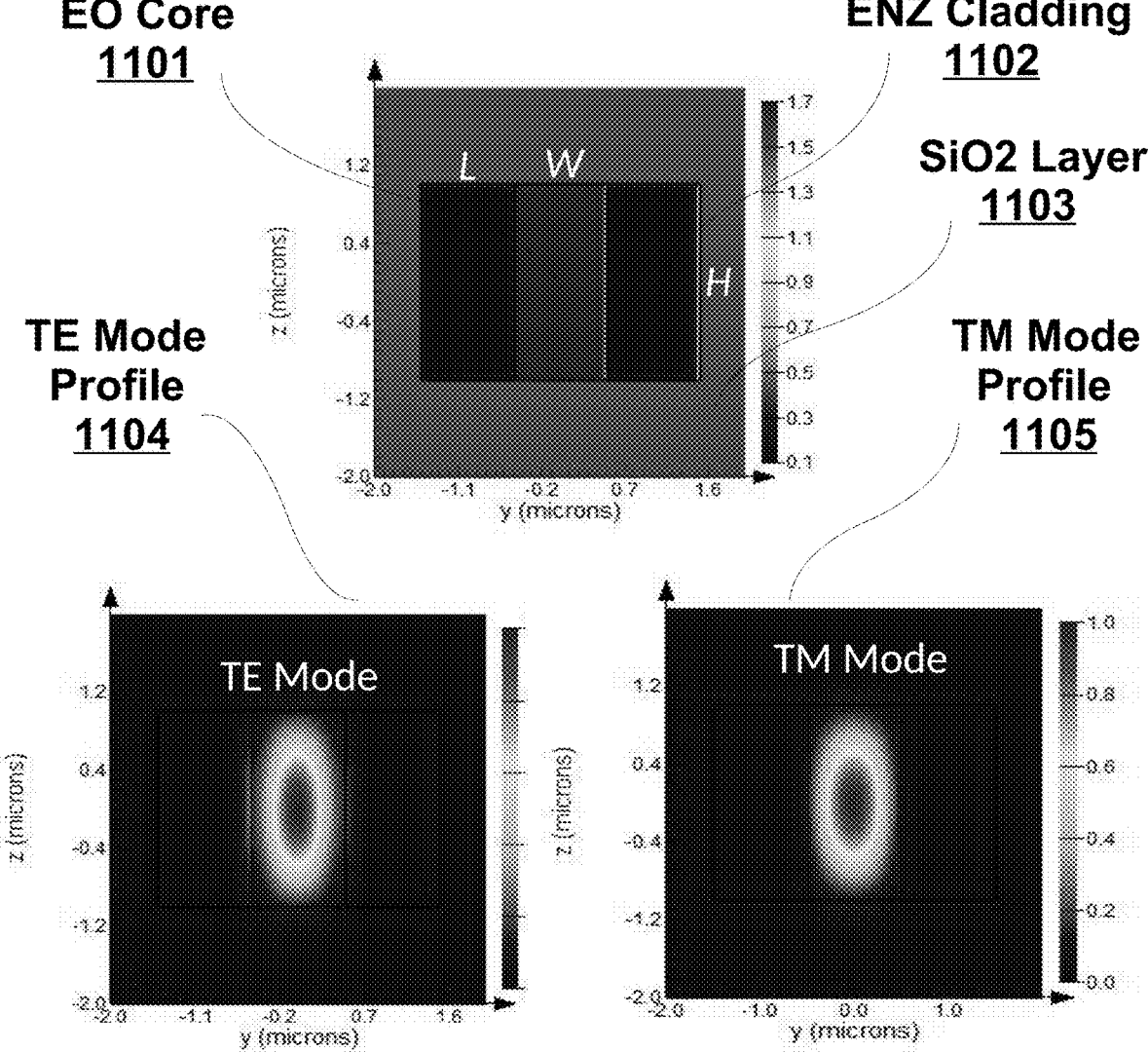
FIG. 11 shows the simplified waveguide cross section for simulating optical mode in FIG. 1 and the relative magnitude of transverse electric field (TE mode) and transverse magnetic field (TM mode).

FIG. 11 shows at the top a simplified waveguide cross section for simulating optical mode in FIG. 1, made with EO core region 1101, ENZ cladding and electrical contact region 1102, and the outer extended and/or protective SiO$_2$ regions 1103, where the operating wavelength "2", the optical refractive index of the EO core material, the SiO$_2$ material, and the ENZ ITO material is chosen to be 1.3 μm, 1.7, 1.5, and 0.001+0.01j, respectively. The y-direction is chosen to be parallel to the surface of the silicon substrate and the z-direction to be perpendicular to the substrate surface. FIG. 11 also shows at the bottom left the relative magnitude of the transverse electric field (TE mode) profile 1104 and at the bottom right the transverse magnetic field (TM mode) profile 1105, when the height of the waveguide core "H" and the width of the waveguide core "W" is chosen to be 2 μm and 1 μm respectively and the width of ENZ ITO cladding layer is chosen to be 1 μm. The dominant electrical field is along y-direction for TE mode 1104 and is along z-direction for TM mode 1105, both are well confined within the core waveguide region without extending out to the cladding layer due to the nature of ENZ material. The optical mode confinement factor, normally named "T", is about 95.7% for the TE mode 1104.

Figure 12:
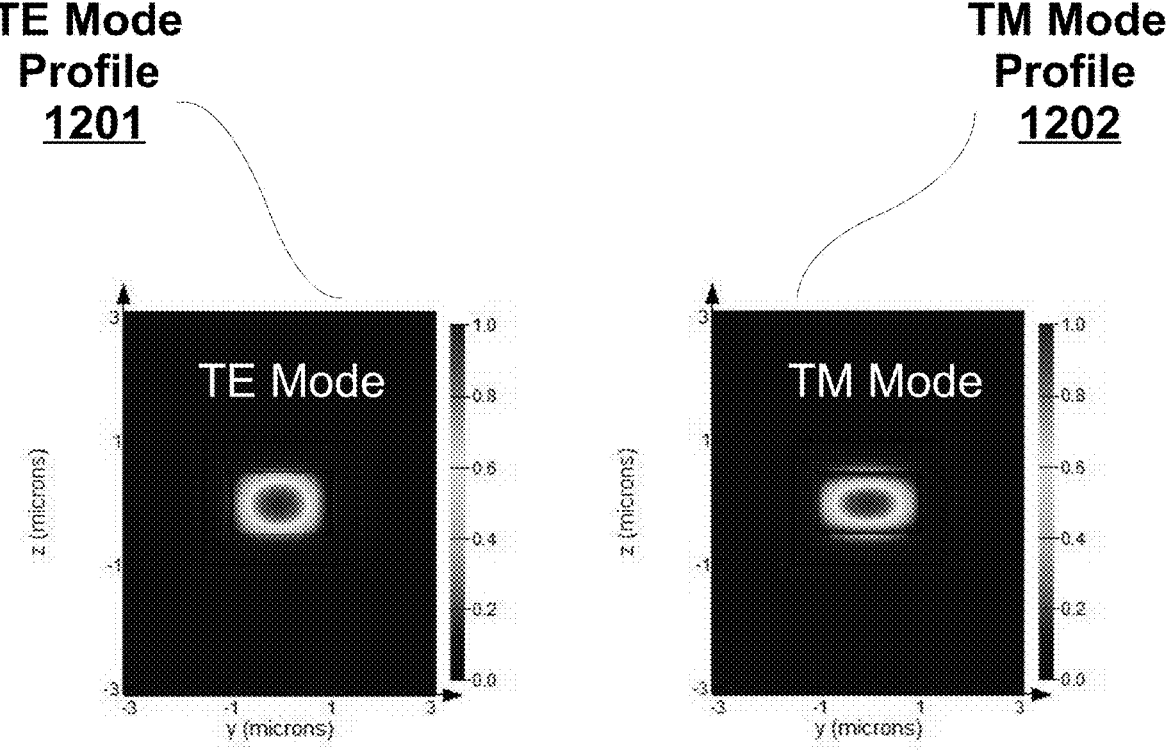
FIG. 12 shows the relative magnitude of TE mode and TM mode with different dimensions of waveguide core region.

FIG. 12 shows the relative magnitude of the transverse electric field (TE mode) profile 1201 on the left side and the transverse magnetic field (TM mode) profile 1202 on the right side when the height of the waveguide core "H" and the width of the waveguide core "W" is chosen to be 1 μm and 2 μm respectively and the width of ENZ ITO cladding layer is chosen to be 1 μm, while the optical refractive indexes of the associated materials are the same as those used in FIG. 11. The dominant electrical field is again along y-direction for TE mode 1201 and along z-direction for TM mode 1202.

Figure 13:
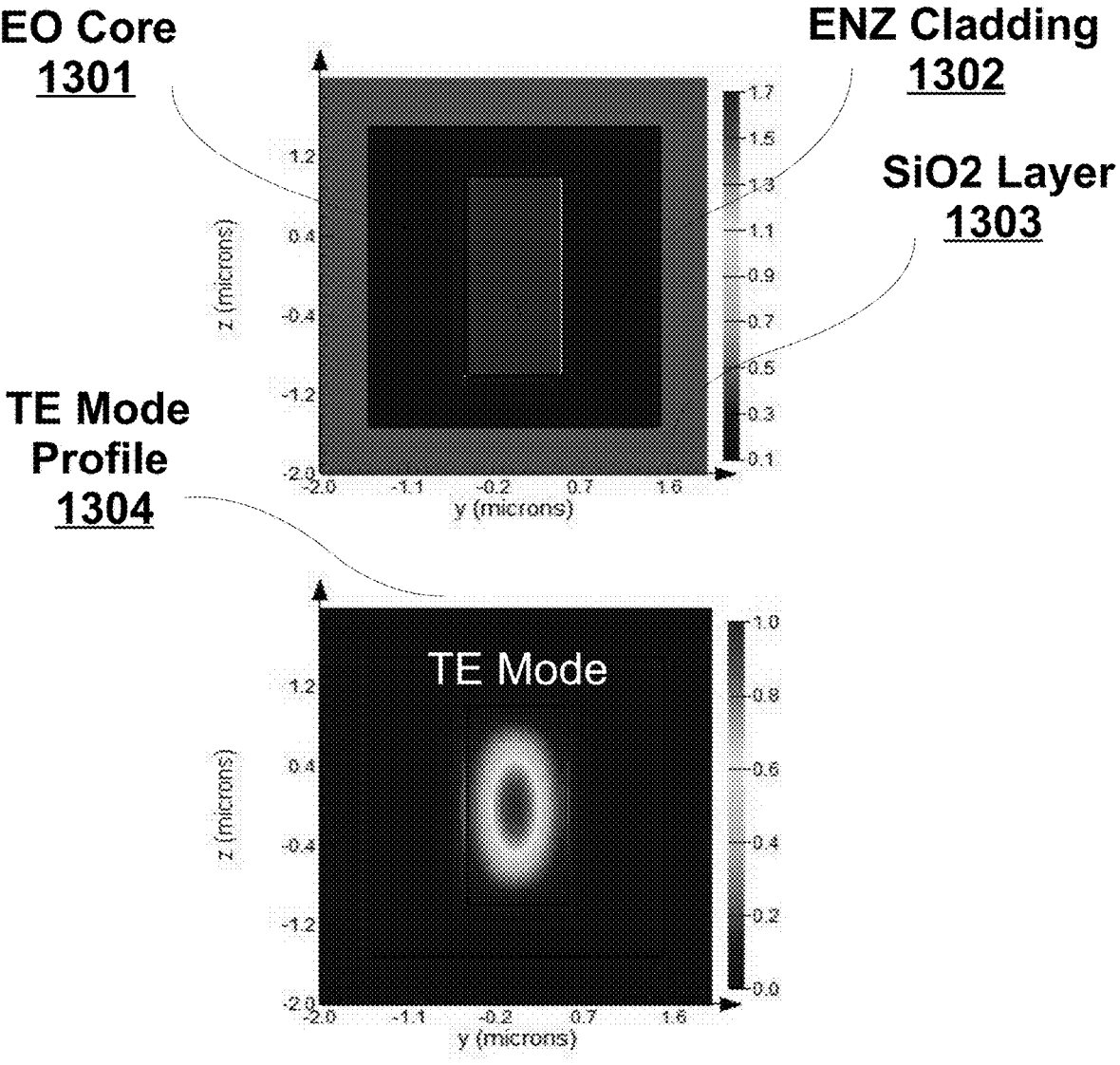
FIG. 13 shows the relative magnitude of TE mode where the waveguide core is enclosed by a two dimensional (2D) rectangular cladding layer made of ENZ material.

FIG. 13 shows at the top the cross section of a waveguide core region 1301 surrounded by a rectangular shape of two dimensional (2D) region 1302 made of ENZ ITO material as the cladding layers, which is further enclosed by the SiO$_2$ material 1303 on all sides. It shows at the bottom the relative magnitude of the transverse electric field (TE mode) profile 1304 which is more confined due to the 2D ENZ enclosure. The waveguide core region is of the same size as in FIG. 11 where the height of the waveguide core "H", the width of the waveguide core "W" and the width of ENZ ITO cladding layer is chosen to be 2 μm, 1 μm, and 1 μm, respectively. The optical mode confinement factor in this case is about 99.8% for the TE mode 1304.

In various embodiments, the width "W" of the core waveguide dimension, as shown for example, in FIG. 1 to FIG. 8, may vary from 20 nm to 2000 nm, which determines the strength of electrical field in the core region by the externally applied voltage through the ENZ ITO electrode contacts, for example 105 in FIG. 1, from both sides of the waveguide core for example 104 in FIG. 1. The smaller the width, the larger the electrical field, and the larger the induced change of the optical refractive index in the core region.

In accordance to various embodiments, the maximum externally applied voltage between electrode contacts, such as between two metal pads of 107 in FIG. 1, may range from the less than 1V to several voltages in the phase shifter sections for each of the MZM arms 904 and 905 in FIG. 9. The value of the maximum voltage is usually determined by the design of the MZM and the choice of digital signal process (DSP) to be used for either PAM4 or coherent QAM applications. The smaller the voltage is, the smaller the total electrical power consumption when driving the high speed MZM for various applications such as 100 Gb/s or 200 Gb/s per optical channel and/or per optical wavelength, or 800 Gb/s and/or 1.6 Tb/s with eight such parallel channels with PAM4 modulation. Smaller voltage such as 1V or less enables PAM4 or coherent QAM based DSP to drive the MZM directly without the need for additional electrical amplifier and thus saves overall cost and total power consumption for MZM and the resulting integrated multichannel systems.

In embodiments, the optical mode of the core waveguide is normally chosen to be TE mode, as an example in the bottom left plot in FIG. 11, with its electrical field pointing parallel to, in case of FIG. 11, the y-direction as shown, to the surface of the substrate and the boxed SiO$_2$ layer, for example the surface of 101 and 102 in FIG. 1, between the two vertically placed ENZ ITO cladding layers, for example 104 in FIG. 1, or by dashed arrows in FIG. 7, onto which the external voltage is applied through the connection to the horizontal ENZ ITO electrode contacts, for example 105 in FIG. 1. The choice of TE mode enables the alignment of the directions of the electric field of the operating light and the externally applied electrical field across the waveguide core region and the effective utilization of the electric-optic interaction in the EO material in the waveguide core, for example 103 in FIG. 1, in order to result in necessary change in the optical refractive index for enhancing modulation efficiency. TM mode may be chosen, in accordance to various embodiments, and the resulting optical refractive index change and the modulation efficiency will differ from that of the TE mode, if the direction of the electrical field of the light mode align differently with that generated by the externally applied voltage.

In various embodiments, the optical waveguide mode may operate at the desired telecom wavelength of around, 1310 nm as shown in FIGS. 11 and 12, or 1550 nm. At such wavelengths, the optical mode tends to extend beyond the core region and penetrate into the cladding layer significantly because of the long wavelength in comparison with the size of the waveguide core. The ENZ ITO material, for example 104 and 105 in FIG. 1, serving as the cladding layers provides substantial optical confinement to the optical mode in the core and prevents the mode from leaking out to the core-cladding interface and further into the cladding layer. The optical mode intensity drops quickly at the core-cladding interface and therefore will not see the losses in the cladding, and the losses at the interface which is normally called waveguide wall and could be relatively rough due to the imperfect practical manufacturing process of small geometry of waveguides. In the example of FIG. 11, the optical mode confinement factor is about 95.7%. The higher the optical mode confinement factor, the larger the overall optical modal effective index change, and the higher the modulation speed and efficiency.

In various embodiments, the optical waveguide TE mode, as shown in the bottom left of FIG. 11 is well confined by the ENZ material on both side of vertical walls of the core-cladding interface. The top and bottom of the waveguide core region in FIG. 1 to FIG. 8 are made of other materials such as SiO$_2$, Si, Si$_3$N$_4$ as shown in their respective embodiments, as part of the MZM phase shifter arms 904 and 905 as shown in FIG. 9. In those embodiments, the optical mode confinement is slightly less from the top and the bottom of the waveguide core as shown in the bottom left plot of TE mode strength in FIG. 11. When the top and the bottom of the waveguide core is also made of the ENZ ITO material as shown in the top figure of FIG. 13, such that the waveguide region is enclosed by a rectangular cladding shape made of ENZ ITO material, the optical mode confinement in the core region is higher. As shown on the left side of FIG. 13, which has the same waveguide core dimensions and refractive index as in FIG. 11, the 2D rectangular enclosure of the waveguide core by the ENZ material makes the optical mode confinement of the dominant TE mode at about 99.8%.

In embodiments, other types of optical waveguides, such as 901, 903, 906, or 908 in FIG. 9 where the electrode contacts are not required to provide electrical field to the waveguide core, the 2D enclosure of the waveguide core by the ENZ ITO material can be employed to enhance the optical mode confinement. One of such examples is the 1×2 MMI 902 at the input of the MZM, and the 2×2 MMI 907 at the output of the MZM in FIG. 9. The 2D enclosure of the core provides more optical confinement and allows for small waveguide turns and sharp bends without incurring more optical losses, and hence becomes more tolerant to the waveguide wall roughness caused by manufacturing and allows for higher density of photonic circuit integration.

In accordance with various embodiments, ENZ ITO cladding layer, for example 104 and 105 in FIG. 1 is also used as high conducting electrical path and electrode contacts connected to the metal pads 107 on the top surface of the photonic chips through metal via 108 for modulators, such as 904 and 905 for MZM in FIGS. 9 and 1003 and 1004 for MRM in FIG. 10. ENZ ITO's electrical conductivity is significantly better, in the range of one to two orders of magnitude, than that of a lightly P-doped or N-doped silicon layer normally employed.

When the waveguide core region is made of EO materials, whose optical refractive index changes accordingly under the externally applied voltage, and the oscillating electric field of the optical wave is aligned with that of the applied electric field, and when the MZM is operated in a push-pull operation on the two arms of the MZM which doubles the amount of optical refractive index change and therefore the resulting effective phase shift experienced by the MZM, one of its key properties of the MZM, "V$_\pi$L", which is the product of applied voltage "V$_\pi$" and waveguide length "L", can be expressed by:

$$V_\pi L = \frac{W\lambda_0}{2\Gamma n_{EO}^3 \gamma_{33}} \tag{1}$$

Where "$V_\pi$" is the externally applied modulating voltage to MZM that can induce an overall phase shift of 180° degree (i.e., $\pi$ degree) to the propagating optical wave in the waveguide between the two arms of the MZM, and "L" is the length of the phase shifter of one of the two parallel MZM arms, "W" is the width of the waveguide core that comprises EO material which may range from 20 nm to 2 $\mu$m in accordance with various embodiments, "$\Gamma$" is the effective optical mode confinement factor in percentage with its maximum value being 100% meaning a total confinement of optical mode in the core region, "$n_{EO}$" is the optical refractive index of the EO material, "$\gamma_{33}$" is the electro-optic (EO) coefficient or the Pockels coefficient of the EO material whose value in the bulk material may range from several tens to several hundreds of picometers per volt (pm/V), and "$\lambda_0$" is the operating wavelength in vacuum normally at 1310 nm or 1550 nm for optical communication applications.

For a high speed MZM, it is desirable to have a value of "$V_\pi L$" as small as possible for high speed, low power consumption, low cost and high density integration. Hence, narrow waveguide width, large optical mode confinement factor, and large EO coefficient are critical to the design of high speed MZM. Practically, the "$V_\pi$" should be less than a few volts or around 1 volt as the digital signal processing (DSP) technology for PAM4 and coherent QAM applications is constantly advancing from 7 nm semiconductor technology to 5 nm and 3 nm technology and further, and "L" should be less than a few millimeters or less than 1 mm, or even several tens of micrometers depending on the applications and supporting designs.

In various embodiments, when the width of EO core waveguide is small enough in comparison to its diffraction limit, a special kind of optical surface plasmon polariton mode may be supported in the EO waveguide core. In such cases, the effective optical modal confinement is relatively high due to the application of ENZ materials as the waveguide cladding layers, and the applied electrical field is very strong due to the proximity of the ENZ material acting simultaneously as the conducting electrode contacts to the core region, and therefore the combination of all of those provides high speed and high efficient MZM operation with a low "$V_\pi L$" and a smaller size for large scale integration. Otherwise the optical surface mode tends to either leak out much more into the cladding region with a small effective optical confinement or being almost absorbed due to the large losses on the metal side of the waveguide core and cladding interfaces if other metals such as gold or silver is used right besides waveguide core.

In various embodiments, ENZ is referred to a special condition for some materials under which the material's absolute permittivity, normally denoted by the Greek letter $\varepsilon$ (called "epsilon"), is becoming close or equal to zero. The ENZ material not only provides a large contrast of optical refractive index between the core and cladding for better mode confinement, but also provides a highly conducting electrical path for external voltage to be applied onto the core region directly. Moreover, when the permittivity of a material is really low, and to the point that it is close or equal to zero, it does not have much capability to store energy, or in other word, it has a very small capacitance if it is used for a capacitor, which means that the material can respond very fast to electric field at a very high speed, thus enable fast modulating signals to directly drive the EO material in the core region for high speed MZM operation.

Within an ENZ material, the free carriers respond to a certain frequency range of the electric field oscillation in the optical wave. Its behavior can be modeled by the Drude model as follows:

$$\varepsilon_r = \varepsilon_\infty - \frac{\omega_p^2}{\omega^2 + \gamma^2}\left(1 + i\frac{\gamma}{\omega}\right) \tag{2}$$

where $\varepsilon_r$ is the relative permittivity of the material, $\varepsilon_\infty$ is the high frequency permittivity, $\gamma$ is the electron scattering rate (or Drude relaxation rate), and $\omega_p$ is the plasma frequency Specifically, the parameters are given by $$\omega_p = \sqrt{Ne^2/(\epsilon_0 m_e)}$$

with "N" as the free carrier concentration, "e" the charge of an electron, "$m_e$" the effective mass of the electron, $\varepsilon_0$ the vacuum permittivity, and by $\gamma = e/(\mu m_e)$ with $\mu$ as the electron mobility, When the free carrier density "N" is chosen in such that at the operating frequency of the optical mode $\omega_{ENZ}$ so that $$\omega_{ENZ} = \sqrt{(\omega_p^2/\varepsilon_\infty - \gamma^2)},$$

the real part of the relative permittivity $Re(\varepsilon_r)=0$, while the imaginary part of the relative permittivity $Im(\varepsilon_r)=\varepsilon_\infty\gamma/\omega_{ENZ}$, whose value depends on the relative ratio of $\gamma/\omega_{ENZ}$. When "$\gamma$" is much smaller than "$\omega_{ENZ}$" as is the case for telecom applications, the imaginary part is also close to zero. Hence the ENZ condition occurs at and around the operating wavelength.

The following additional examples pertain to further embodiments.

In an example, the PIC comprises: a plurality of MZMs each to modulate an optical input signal with a RF input signal, having ENZ material as both part of the cladding layers and the electrical path and contacts on the phase shifter waveguides in the two arms of MZMs that operate in push-pull mode, and ENZ material as part of the cladding layers for the input signal splitting waveguide and the output signal combining waveguides, wherein the splitting waveguide may be 1×2 MMI and the combining waveguide may be 2×2 MMI.

In an example, the PIC and the associated apparatus comprises: a plurality of straight and/or curved waveguides each to fast tune phase of the optical wave traveling inside the waveguide in predetermined relationship with respect to all others to steer the angle of the optical beam going outside of the PIC, having ENZ material as both part of the cladding layers and the electrical path and contacts on the phase shifter waveguides and EO material as part of the waveguide core region.

In an example, the PIC and the associated apparatus comprises: a plurality of MRMs each to modulate an optical input signal with a RF input signal, having ENZ material as both part of the cladding layers and the electrical path and contacts on the phase shifter waveguides in the two arms of MZMs that operate in push-pull mode, and ENZ material as part of the cladding layers for the input bus waveguide and the output bus waveguides, wherein the bus waveguide may be straight and/or curved and is separated with the micro ring resonator with a small gap for a predetermined optical coupling coefficient of the input and output mode with the mode inside the ring resonator.

In an example, the PIC and the associated apparatus comprises: a plurality of straight and/or curved waveguides; a plurality of MZMs; a plurality of input and output waveguides; each having ENZ material as both part of the cladding layers and the electrical path and contacts, and enabling tight optical confinement, proximity placement of various functions, small device capacitance, and sharp turnings of waveguide routings.

In an example, the PIC and the associated apparatus comprises: a plurality of waveguides, straight, and/or curved or rounded, each having ENZ material as both part of the cladding layers and the electrical path and contacts, wherein the core region are left empty and unfilled; a plurality of input and output waveguide coupled into and out of those empty and unfilled waveguides, enabling through the output of the beam or beams from the PIC the detection of the optical refractive index of the material present to the PIC, and thus the identification of the material itself under detection.

In an example, the PIC comprises transmitting and/or receiving devices of various functions for input, routing, modulating, tuning, processing, detection, reconfiguration, and/or output: having either a silicon photonic based substrate or a glass substrate; having either a EO material or a silicon PN junction or vacuum as the core of the waveguide; having ENZ material as the cladding layers and/or electrode contacts; having externally applied voltage through the top surface metal contacts to the metal via and to the ENZ based electrodes.

Various embodiments may include any suitable combination of the above-described embodiments including alternative embodiments of embodiments that are described in conjunctive form. Furthermore, some embodiments may include appearances for systems and apparatuses having any suitable means for carrying out the various operations of the above-described embodiments.

The above detailed description of the illustrated embodiments, including what is described in the Abstract, is not intended to be exhaustive or limiting as to the precise forms disclosed. While specific implementations of, and examples for, various embodiments or concepts are described herein for the illustrative purposes, various equivalent modifications to them may be possible, as those skilled in the relevant art will recognize. Those modifications may be made in light of the above detailed descriptions, the Abstract, the Figures, and/or the Claims.

What is claimed is:

1. A photonic waveguide device comprising:
a BOX layer on top of a substrate;
a waveguide core region on top of said BOX layer;
a waveguide cladding layer on sides of the waveguide core region;
a protective layer on top of both the waveguide core region and the waveguide cladding layers;
a metal via connecting part of the waveguide cladding layer to a metal pad on the top surface of the device,
wherein the waveguide core region is formed by an electro-optic (EO) material having a large electro-optic coefficient or Pockels coefficient which exhibits optical refractive index change when its optic axis is aligned with an externally applied electrical field, and
wherein the waveguide core region may comprise both the EO material and a rib formed by either silicon or $Si_3N_4$ that connects to a part of the slab waveguide formed by the same material, where the height of the rib is a small fraction of that of the waveguide core region.

2. The photonic waveguide device of claim 1, wherein the waveguide core region is formed by a silicon PN junction with a portion of its core width doped with P-type of dopants and the other portion doped with N-type of dopants while the corresponding slab portion of the waveguide core region connecting to the portion of the waveguide core region doped with P-type of dopants and the portion of the waveguide core region doped with N-type of dopants is also doped with the same type of corresponding dopants.

3. A photonic waveguide device comprising:
a BOX layer on top of a substrate;
a waveguide core region on top of said BOX layer;
a waveguide cladding layer on sides of the waveguide core region;
a protective layer on top of both the waveguide core region and the waveguide cladding layers;
a metal via connecting part of the waveguide cladding layer to a metal pad on the top surface of the device,
wherein the waveguide core region may be left unfilled, which forms a hollow waveguide enclosed by a transparent conducting ENZ cladding layers that confines optical wave tightly inside the waveguide core region for optical refractive index sensing when a certain class of materials is placed inside the waveguide core region for its detection.

* * * * *